J. HART.
Coffee-Roasters.
No. 137,839.          Patented April 15, 1873.
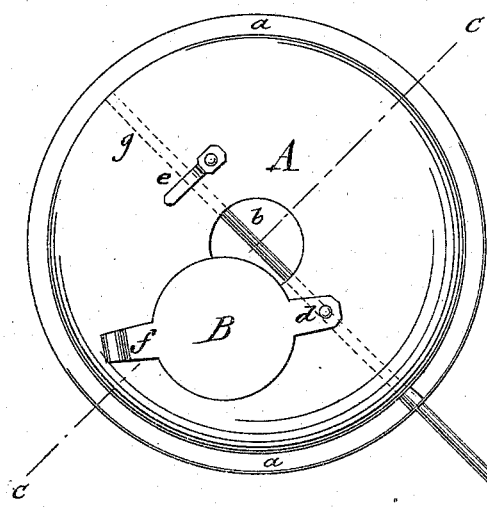
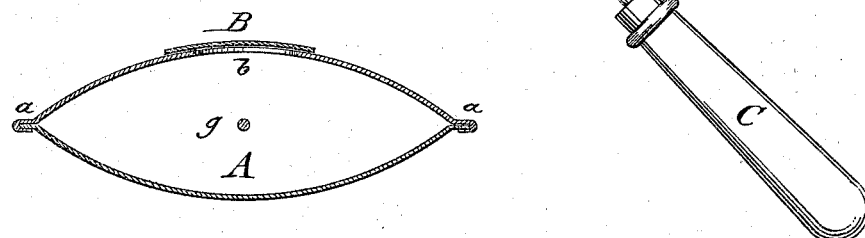
Witnesses:
Inventor:

UNITED STATES PATENT OFFICE.

JAMES HART, OF KEKOSKEE, WISCONSIN.

IMPROVEMENT IN COFFEE-ROASTERS.

Specification forming part of Letters Patent No. 137,839, dated April 15, 1873; application filed March 1, 1873.

*To all whom it may concern:*

Be it known that I, JAMES HART, of Kekoskee, in the county of Dodge and State of Wisconsin, have invented a new and Improved Coffee-Roaster, of which the following is a specification:

Figure 1 is a top view of my invention with slide-cover partly open, and Fig. 2 is a vertical transverse section of the same on the line $c\ c$, Fig. 1.

Similar letters of reference indicate corresponding parts.

The object of my invention is to furnish to the public a simple and convenient kitchen utensil, by the use of which coffee beans may be quickly roasted, preserving all the fragrant volatile oils, and producing thereby a more aromatic coffee. My invention consists of a lens-shaped metallic vessel provided with a handle and adjustable slide covering the aperture for the admission of the beans, which is slowly turned over the fire till the beans are properly roasted.

The simplicity of the instrument allows of its cheap manufacture, and its easy handling will promote a more frequent roasting, and therefore produces a better coffee, as is the case by roasting a greater quantity so that the aromatic oils escape before use.

In the drawing, A represents the body of the roaster, of flat lens-like shape, and manufactured of tin or other sheet metal. It consists of two half shells of circular shape, which are, by means of flanges $a$, soldered, riveted, or otherwise suitably connected. A round or oval opening, $b$, in the top shell admits the coffee beans to the interior of the body A, and is closed by the cover B, which is hinged or pivoted at $d$, and held in position by lug $e$ gliding over the handle-piece $f$ of cover B. A strong wire or metallic band, $g$, passes either diametrically through body A, or may be riveted to the upper and lower shells or around the circumference of their joints, or connected in any other suitable way to roaster A, and is provided with a handle, C, that it may be easily turned on the fire.

As none of the volatile oils which give aroma to the coffee can escape, the roasted beans gradually absorb the same again, and produce therefore a superior coffee.

This roaster may be used with advantage for other purposes, as for making pop-corn, &c., and also as a receptacle for storing the roasted coffee, keeping the same always fresh therein.

Having thus described my invention, I claim as new and desire to secure by Letters Patent—

The coffee-roaster A, consisting of two shells joined by flanges $a$ having opening $b$, cover B, and handle connection C, and lug $e$, substantially as and for the purpose described.

JAMES HART.

Witnesses:
   H. T. HUBBARD,
   L. LARRABEE.